United States Patent

[11] 3,533,374

| [72] | Inventor | Paul Luescher,<br>Canton Berne, Tauffelen, Switzerland |
|---|---|---|
| [21] | Appl. No. | 715,627 |
| [22] | Filed | March 25, 1968 |
| [45] | Patented | Oct. 13, 1970 |
| [32] | Priority | March 28, 1967 |
| [33] | | Switzerland |
| [31] | | 4,306/67 |

[54] DEVICE FOR MELTING CHOCOLATE AND DELIVERY OF THE CHOCOLATE MELT
3 Claims, 1 Drawing Fig.

[52] U.S. Cl. ........................................ 118/20, 118/25, 222/146
[51] Int. Cl. ........................................ A23g 3/20
[50] Field of Search ........................................ 118/20, 25, 302,3; 222/146(HE), 504

[56] References Cited
UNITED STATES PATENTS

| 2,252,542 | 8/1941 | Beeh | 118/3 |
| 2,979,231 | 4/1961 | Witherspoon | 222/504X |
| 3,042,265 | 7/1962 | Rodth | 222/146 |
| 3,200,997 | 8/1965 | Creswick | 222/146X |
| 3,204,832 | 9/1965 | Barber | 222/146X |
| 3,231,144 | 1/1966 | Rouanet et al. | 222/504X |
| 3,258,166 | 6/1966 | Kuckens | 222/504X |

Primary Examiner—John P. McIntosh
Attorney—Arnold Robinson

ABSTRACT: An apparatus for making chocolate-coated articles comprises a downwardly tapering electrically-heated container, supported on an adjustable arm over a base plate or platform, and terminating in a vertical cylindrical outlet having an annular constriction at its extremity and housing a polygonal-shaped plunger which terminates at its lower end in a conical-tapered portion so that the plunger at rest seats in the constricted opening to seal it. Insulated wiring is coiled about the cylindrical outlet so that when energized, it forms a solenoid therewith and functions to raise the plunger from its seating and to provide an exit for the molten chocolate.

Patented Oct. 13, 1970
3,533,374
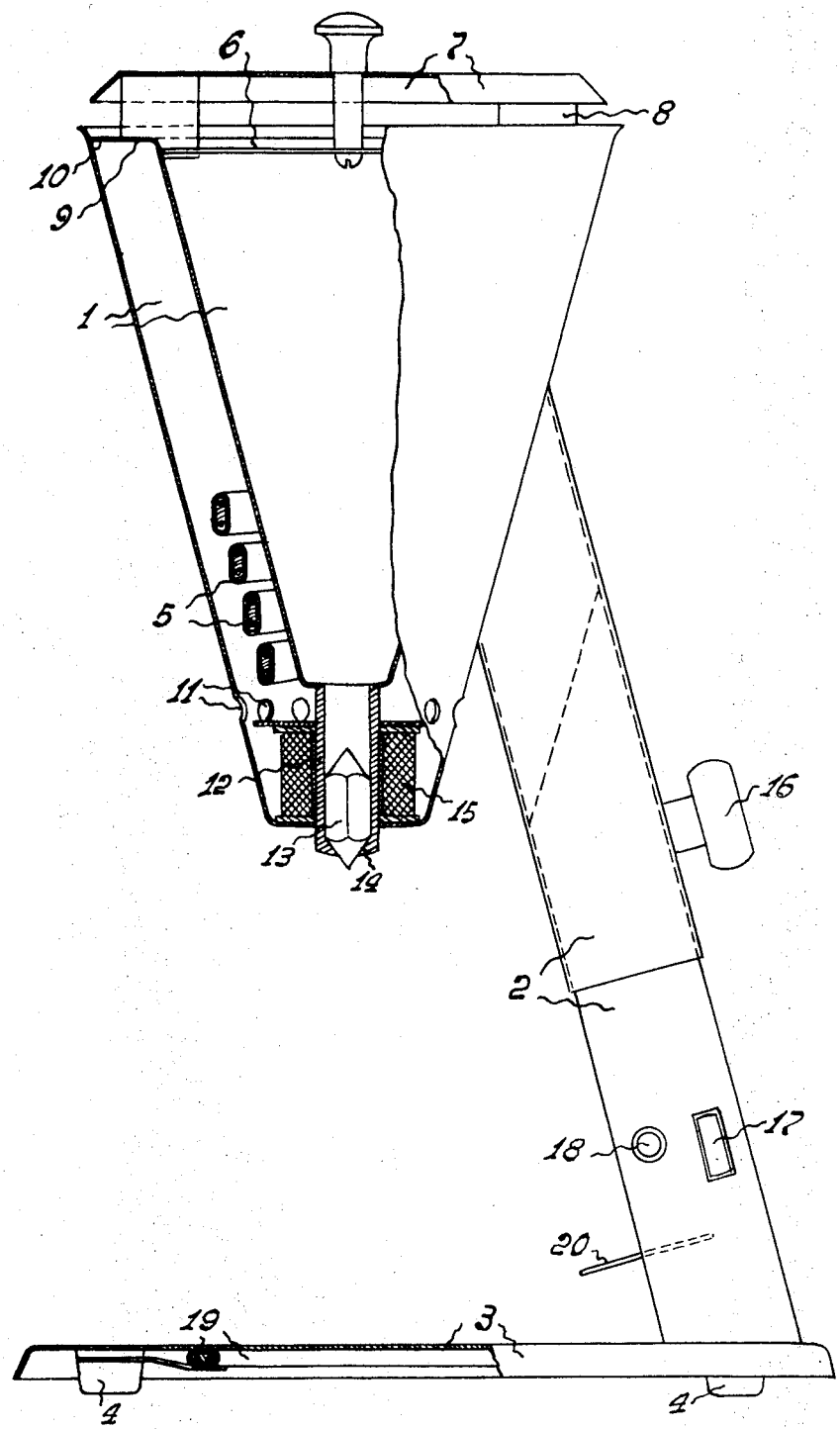
INVENTOR.
BY

DEVICE FOR MELTING CHOCOLATE AND DELIVERY OF THE CHOCOLATE MELT

In the production of chocolate coatings on pastry, fruit, and other articles of food or medicine, it is customary to heat the chocolate in pans, and then to ladle out the molten material and pour it over the articles to be coated therewith. This is a complicated and messy procedure requiring much work in the subsequent cleaning of the utensils; in addition, there is a danger that the chocolate in the pans may be overheated and thus damaged.

It is the object of this invention to provide an improved apparatus for dispensing molten chocolate wherein the aforesaid disadvantages are largely eliminated and a convenient and readily controllable device is provided which is portable and wherein the chocolate need be heated only at the time it is being dispensed or doled out onto the articles to be coated therewith.

In accordance with the present invention, in apparatus for dispensing molten chocolate, dispensing means are provided which comprise a vertical cylindrical sleeve forming an outlet in the base of a heated dispensing vessel, a constriction about the external end of said sleeve forming an annular valve seating therein, a plunger located for vertical sliding movement in said sleeve, said plunger tapering downwardly to rest normally in said seating to close said sleeve, and an electrically energizable coil of insulated wire about said sleeve and forming a solenoid therewith, whereby on excitation of said coil, said plunger is lifted vertically to open said sleeve. The plunger is preferably of polygonal cross section while the sleeve is cylindrical to provide space therebetween and allow the molten chocolate to flow past the side walls of the plunger. A particular advantage follows from the eddy current heating effect on the plunger in that it heats the latter and helps maintain the chocolate in the molten state.

The dispensing means are preferably located in the base of a double-walled vessel, having a downwardly tapering cross section, and between which double walls, electrical heating means are provided for heating the chocolate to melt it. The vessel is preferably carried on an adjustable arm or support to maintain it at a desired height above a base plate or platform on which the comestible articles to be coated can be supported, electrical heating means also being provided under the platform for heating the comestibles.

An example of a suitable apparatus in accordance with this invention is shown in the accompanying drawing in side elevation, partly in section.

The apparatus comprises the double-walled metal container 1 which tapers downwardly and which is supported adjustably as to its height by side arm 2 comprising two telescoping portions which can be mutually fixed at any desired relative location by terminal screw 16. Side arm 2 at its base is carried at a convenient angle on base plate or platform 3 supported on feet 4.

Electric radiant heat elements 5 are housed in the space between the double walls 1 about the central container portion and function to heat and melt the chocolate contained therein. The inner portion of the container is closed by lid 16 which in turn, via supports 8, carries an upper lid or canopy 7 which extends beyond the circumference of the inner portion and over the upper part of the double-wall portion. Flange 9 extends radially from the upper rim of the inner wall against the outer wall, and presents openings 10 at its circumference. Openings 11 are provided in the lower portion of the space between the double walls for the ingress of air through the double-wall portion and out through the opening 10.

An outlet in the form of a cylinder or pipe 12 extends from the base of the inner vessel vertically downward through the double-wall portion therebelow, and through the base of the outer wall, to terminate in an annular constriction or valve seating 14. Within the cylinder 12, an elongated plunger 13 of ferromagnetic material, tapers at its lower end into a conical portion, is provided. Insulated wiring is coiled about the cylinder or pipe 12 to form therewith a solenoid 15 which, when activated, causes the plunger 13 to rise within the cylinder 12 and thus free the opening for the passage of molten chocolate by gravity therethrough.

The current supply for the heating elements 5 passes through the portions of arm 2 via switch 17; a signal lamp 18 indicates the switching position of the heating element 5, and another heating element 19 is coupled in parallel to the heating element 5 in the base plate 3 to heat any comestibles supported thereon. A switch (not shown) arranged in the arm 2 and which is within the circuit for the solenoid 15, can be turned on with the aid of the pivot arm 20 and thus to raise the valve member 13 when desired.

Advantageously, the polygonal cross section in the plunger 13 allows molten chocolate to pass between it and the walls of the sleeve 12; plunger 13 is heated by the eddy currents developed when the solenoid is in operation and this heat maintains the chocolate in molten state.

From the foregoing, it will be appreciated that the arrangement of this invention provides a neat and efficient means of dispensing molten chocolate and for coating articles therewith.

I claim:

1. Apparatus for dispensing molten chocolate comprising a vessel having an inner and an outer wall, said inner wall defining an inner tapered container for holding chocolate, electrical heating means between said inner and outer wall for heating and melting chocolate within the inner vessel, means providing for the entry and exit of air between said inner and outer walls, a vertical cylindrical sleeve leading from the bore of said inner container and defining an outlet passage for the chocolate in said inner vessel, a constriction about the bottom end of said sleeve forming an annular valve seat therein, a plunger of polygonal cross section located for vertical sliding movement in said sleeve, said plunger having a tapering portion adapted to rest normally in said seat to close said sleeve, and an electrically energizable coil of insulated wire about said sleeve and forming a solenoid therewith, whereby on excitation of said coil, said plunger is lifted vertically to open said sleeve, said plunger also being heated by the eddy currents developed when said solenoid is in operation whereby said latter heat maintains the chocolate in a molten state.

2. Apparatus as set forth in claim 1 wherein said outer wall defines an outer tapered container having a base, said sleeve and said coil being disposed within the space between the base of said inner container and the base of said outer container, whereby said latter space is in open communication with the space between the inner and outer walls in which said heating means is disposed.

3. Apparatus as set forth in claim 1 for forming chocolate coatings on comestible articles, comprising a platform for supporting said comestible articles, electrical heating means under said platform for heating said comestible articles, and adjustable supporting means for maintaining said vessel a predetermined height above said platform.